United States Patent [19]

Schuder et al.

[11] Patent Number: 4,976,630
[45] Date of Patent: Dec. 11, 1990

[54] CHIPCARD READER

[75] Inventors: Bernd Schuder, Schwaigern; Manfred Reichardt, Weinsberg, both of Fed. Rep. of Germany

[73] Assignee: Amphenol Corporation, Wallingford, Conn.

[21] Appl. No.: 536,959

[22] Filed: Jun. 12, 1990

Related U.S. Application Data

[63] Continuation of Ser. No. 323,998, Mar. 16, 1989, abandoned.

[30] Foreign Application Priority Data

Mar. 25, 1988 [DE] Fed. Rep. of Germany ....... 3810275

[51] Int. Cl.$^5$ ........................ H01R 23/72; G06K 7/04
[52] U.S. Cl. .................................... 439/260; 235/441; 235/482; 439/328
[58] Field of Search .............................. 439/59–62, 439/260, 267, 325–328; 235/441, 479, 482–486

[56] References Cited

U.S. PATENT DOCUMENTS

| 2,802,188 | 8/1957 | Badders | 439/325 |
|---|---|---|---|
| 3,917,372 | 11/1975 | Selinko | 439/298 |
| 4,236,667 | 12/1980 | Crowley et al. | 235/482 |
| 4,575,703 | 3/1986 | Shishido | 235/482 |
| 4,602,351 | 7/1986 | Shimamura | 235/441 |
| 4,717,817 | 1/1988 | Grassl et al. | 235/441 |
| 4,724,310 | 2/1988 | Shimamura et al. | 235/483 |
| 4,735,578 | 4/1988 | Reichardt et al. | 439/152 |
| 4,752,234 | 6/1988 | Reichardt et al. | 439/260 |
| 4,781,612 | 11/1988 | Thrush | 439/62 |
| 4,795,897 | 1/1989 | Chalendard | 235/482 |
| 4,799,891 | 1/1989 | Reichardt et al. | 439/43 |
| 4,814,593 | 3/1989 | Reichardt et al. | 235/486 |

Primary Examiner—Neil Abrams
Attorney, Agent, or Firm—Bacon & Thomas

[57] ABSTRACT

A chipcard reading apparatus includes a stationary frame and a contact element support mounted within an opening in the frame for reciprocal movement between a reading position and an initial position. At least one guide path for guiding the reciprocal movement of the contact element support is provided in the frame, and at least one such guide path is provided in the contact element support. Movement of the contact element support into the reading position is initiated by pushing of the chipcard into the reader; and return of the support to the initial position is accomplished by pulling of the chipcard from the reader. The chipcard is held in the reader by a brake which contacts the chipcard when the support is in the reading position, at which time the contact elements are securely in contact with corresponding contacts on the chipcard.

26 Claims, 4 Drawing Sheets

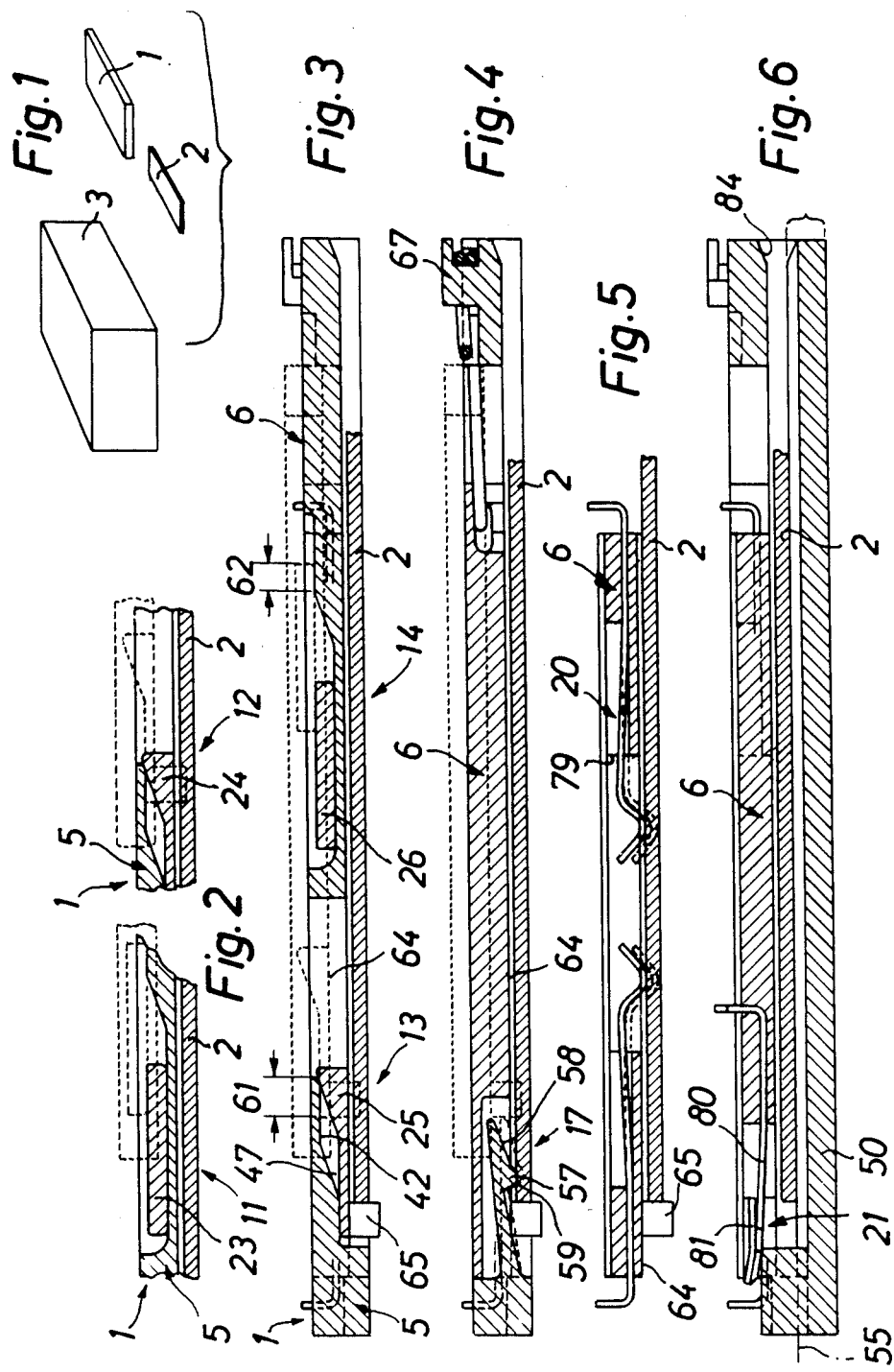

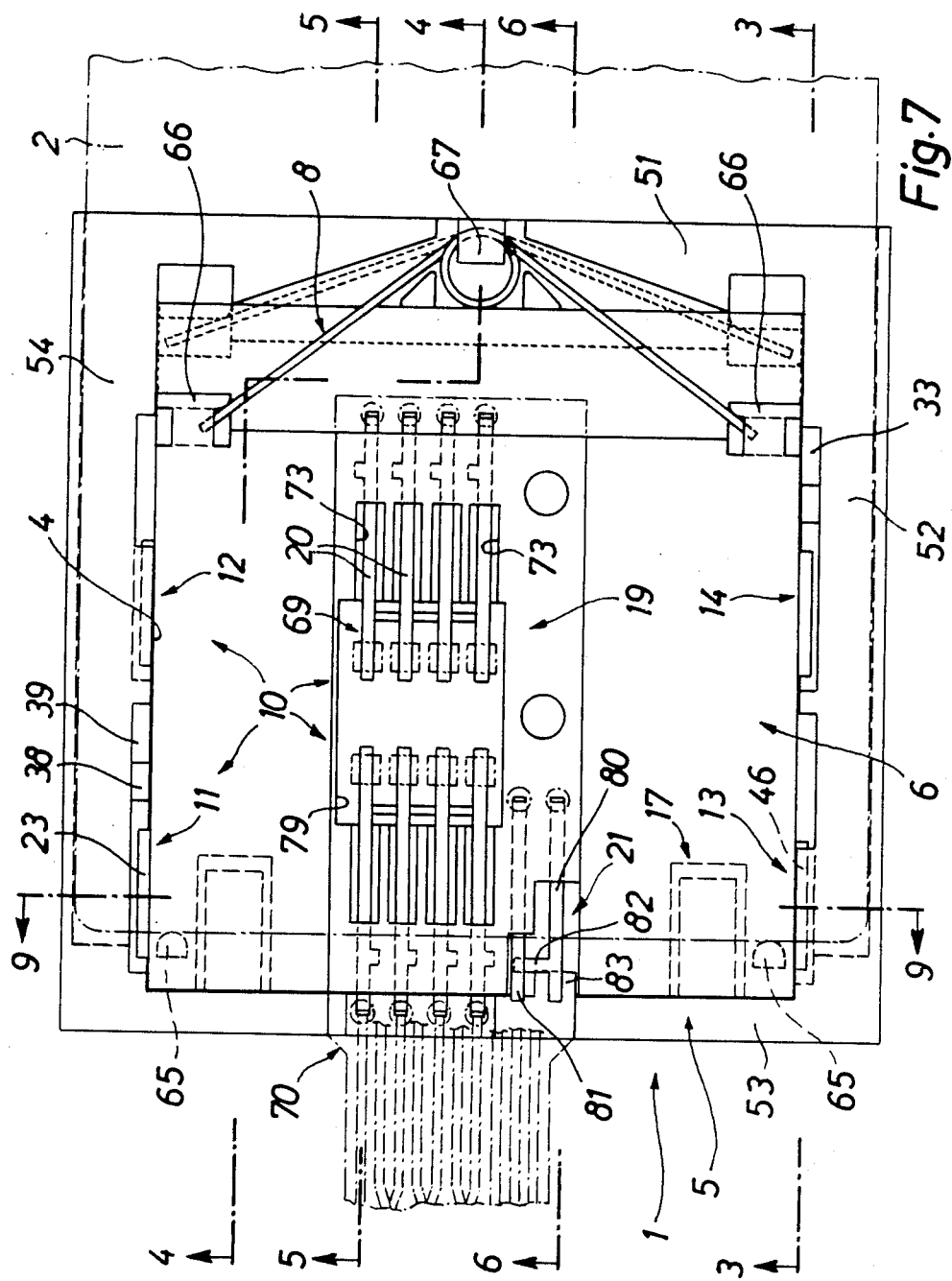

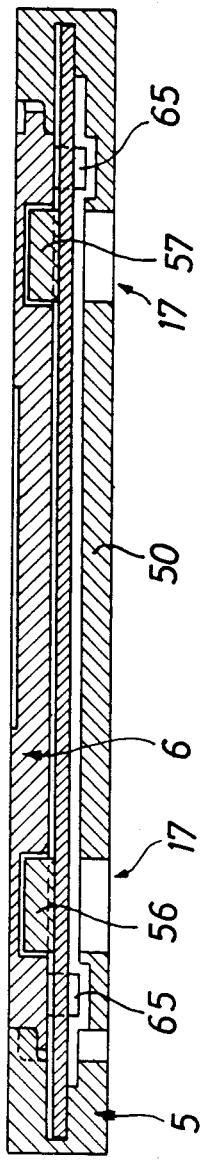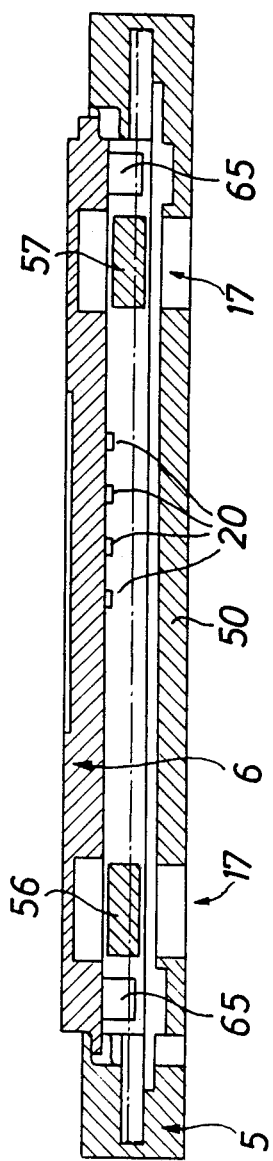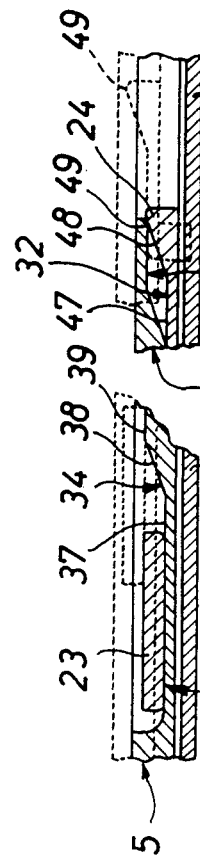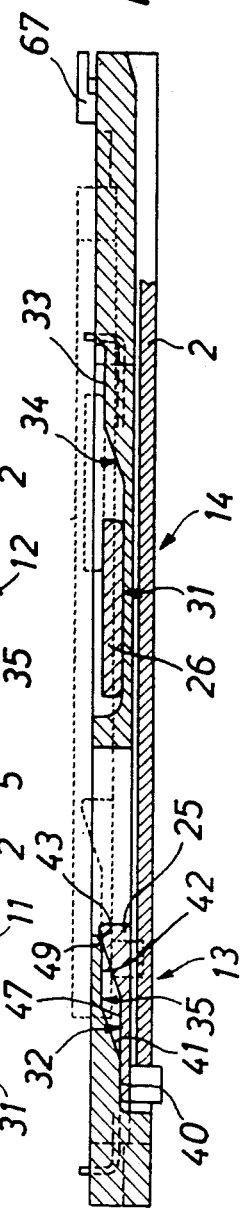

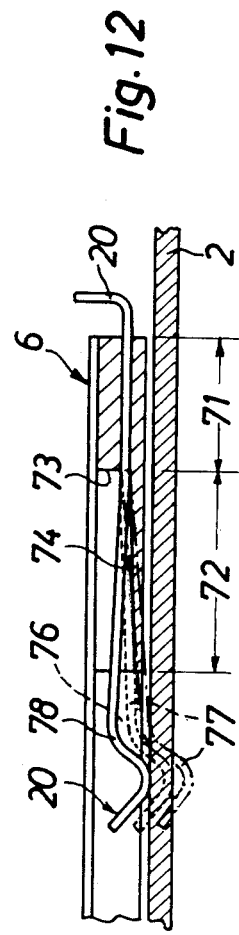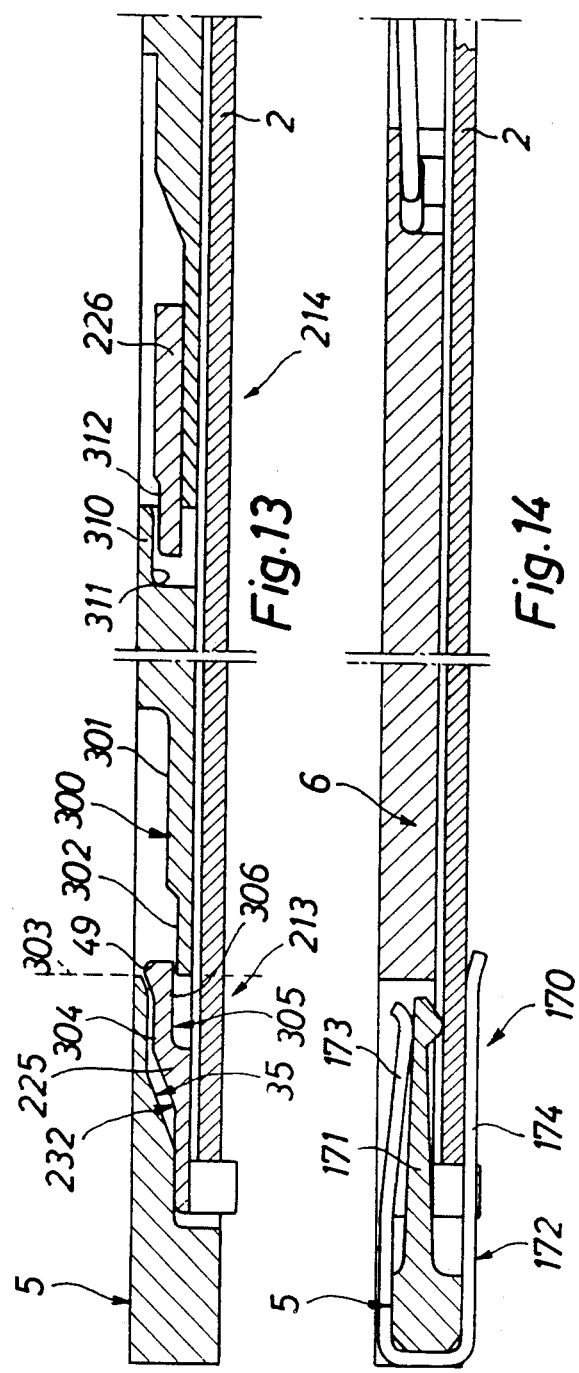

CHIPCARD READER

This application is a continuation of application Ser. No. 323,998, filed Mar. 16, 1989, now abandoned.

TECHNICAL FIELD

The invention relates to a chipcard reader which is also referred to as a chipcard contacting apparatus. Such a chipcard reader makes contact engagement with the contacts on a chipcard so as to allow the reading of information stored in the chipcard and to possibly input new information into the chipcard. Such chipcard readers are used in a variety of different apparatus, for example in a telephone apparatus, to allow the user to make a telephone call.

BACKGROUND ART

Chipcard readers are already known and attention is drawn to the following German laid-open applications: DE-OS No. 29 52 442, DE-OS No. 33 43 727, DE-OS No. 33 43 757 and DE-OS No. 34 02 632. Attention is further drawn to U.S. Pat. No. 4,714,310 and European published application No. 0 234 654.

In a known chipcard reader a stationary component, for example a housing, includes a movable part in the form of a contact support which (contact element support) is reciprocally mounted between an initial and a reading position. When the chipcard is inserted into the chipcard reader, the movement of the chipcard into the reader from the initial to the reading position causes a movement of the contact support such that the contact elements supported by the contact support come into engagement with the corresponding contacts on the chipcard. To remove the chipcard from the just mentioned reading position, it is necessary to simply pull at the end of the chipcard projecting from the chipcard reader so that the chipcard, which is held in the reading position by the so-called chipcard brake, is released from the brake. During the removal of the chipcard from the chipcard reader, the return movement of the contact support is provided by spring means acting on the contact support. A chipcard reader of the type just described is said to operate according to the push-pull principle.

Chipcard readers have to fulfil a number of strict requirements. First of all, an impeccable contact engagement with the contacts on the chipcard has to be provided, even if frequent use occurs. Moreover, the chipcard reader should be as small as possible, so that it can be used for applications where only limited space is available. For instance, if the chipcard reader is to be used in an automobile telephone, the problem of space becomes important, because the vehicle dash board provides for little space.

BRIEF SUMMARY OF THE INVENTION

It is an object of the present invention to provide a chipcard reader which combines excellent operating capabilities with the requirement that the chipcard require little space. It is a particular object of the invention to provide a chipcard reader which has a small height. Further, the width of the chipcard reader should extend only a slightly beyond the width of the chipcard. It be also desirable that the depth of the chipcard reader is small.

It is another object of the present invention to provide a chipcard reader which can be manufactured at low cost. The components forming the chipcard reader should be amenable to low cost assembly of the reader itself production, and a low cost assembly of the reader itself should be possible.

Finally it is a general object of the present invention to overcome the disadvantages of the prior art.

In accordance with a particular embodiment of the invention one or a plurality of guide paths are provided at a frame. The guide paths cooperate with corresponding guide paths at the contact support, so as to provide for a positive or form-fit guidance of the movement of the contact support from its initial position to its reading position and vice-versa.

Preferably, the form-fit or positive coupling guidance causes a lowering of the contact support together with the contact elements towards the chipcard. Also, preferably, the contact elements of the contact support are biased so as to shorten the length of the path required for making contact. Consequently, the height of the chipcard reader is reduced. The bias for the contact elements is provided at the time the contact elements are injection moulded to form a single piece contact support. The set of contact elements, comprising individual contact elements, forms together with the contact support a single piece and is also equipped with the required guide paths. The guide paths are provided at guide elements of the contact support.

Preferably, an end position switch is provided together with the other contact elements and, preferably, the contact elements are leaf spring contact elements and all contact elements including the end position switch are embedded by the injection moulding. This will again reduce the height of the chipcard reader, and the force opposing the insertion of the chipcard caused by the end position switch will be small.

BRIEF DESCRIPTION OF THE DRAWINGS

For a better understanding of the invention reference may be made to the accompanying drawings, in which:

FIG. 1 is a schematical representation of a chipcard reader together with a chipcard as well as an apparatus, for instance a telephone apparatus, within which the chipcard reader is to be installed;

FIG. 2-6 are sectional views along line 3—3 and 4—4 and 5—5 and 6—6, respectively, in FIG. 7;

FIG. 7 is a top plan view of a chipcard reader according to a preferred embodiment of the invention;

FIG. 8 is a sectional view along line 9—9 in FIG. 7, with the chipcard not yet inserted, i.e. the chipcard reader and the contact support are located in the respective initial positions, FIG. 9 is a cross-sectional view along line 9—9 in FIG. 7 with the chipcard reader being inserted, and consequently the chipcard reader and the contact support, respectively, being in their reading positions;

FIGS. 10 and 11 are sectional views, corresponding to those of FIGS. 2 and 3 showing additional aspects of the chipcard reader of the preferred embodiment;

FIG. 12 is an enlarged view of a part of FIG. 5;

FIGS. 13 and 14 are sectional views similar to the left parts of FIGS. 3 and 4 showing additional embodiments of the invention.

DETAILED DESCRIPTION OF THE PREFERRED EMBODIMENTS

In FIG. 1, reference numeral 3 refers schematically to an apparatus, for example a telephone apparatus, within which a chipcard reader (chipcard contacting apparatus) 1 in accordance with the invention has to be installed. After the chipcard reader 1 is installed in the apparatus 3, a chipcard 2 is used to bring the apparatus 3 into an operative condition. This is done by an operator who will push the chipcard 2 into the chipcard reader 1.

In FIGS. 2 through 11 the chipcard reader 1 of the invention is shown in detail, the dashed or dotted line representations referring to the initial position of the card 2 in the chipcard reader 1, while the solid lines represent the reading position.

The design of the chipcard reader 1 of the invention will be explained specifically with reference to FIG. 7 and FIGS. 2 through 4.

The chipcard reader 1 comprises a stationary component in the form of a frame 5 which is fixedly mounted at the apparatus 3 in a usual manner. The frame 5 forms a nearly square shaped opening 4 within which a movable part in the form of a contact element support (contact support) 6 is reciprocally mounted. The contact element support 6 can be moved between an initial position (dotted) and a reading position (solid lines). The contact element support 6 is biased into its initial position by spring means 8.

Support and guide means 10 are generally provided so as to allow for the relative movement between the contact element support 6 and the frame 5. Support and guide means 10 specifically provide for a lowering movement of the contact support 6 during the movement of the contact element support from its initial position to its reading position.

In the embodiment shown, the support and guide means 10 are formed by first through fourth guide means 11-14 which are provided at and close to the four corners of the contact element support 6 and correspondingly also at the frame 5.

Further, holding or brake means 17 (see FIGS. 4 and 7) are provided to hold the chipcard 2 together with the contact support 6 in the reading position against the force of said spring means 8.

A set 19 of contact elements is either mounted to the contact element support 6, together with an end position switch 21, or else the set 19 of contact elements is formed integrally with contact element support 6.

The first through fourth guide means 11-14 have identical cross-section. Thus, the first guide means 11 corresponds in substance to the fourth guide means 14 and the second guide means 12 corresponds in substance to the third guide means 13. Each one of the first through fourth guide means 11-14 provides for a form-fit or interlocking or positive guide for the movement of the contact element support 6 from the initial position to the reading position, and vice-versa the 1st through 4th guide means (and thus the form-fit guide) comprise guide paths 31, 32 and 34, 35 (see FIGS. 10 and 11) which are arranged on the frame and on the contact element support, respectively. The "contact element" guide paths 31, 32 on the contact element support 6 are provided at first through fourth guide elements 23-26.

The first guide means 11 comprises the first plane "contact support" guide path 31 and a first "frame" guide path 34 formed at the frame 5 for cooperation with said contact support guide path 31. The first frame guide path 34 comprises a plane or flat section 37, a ramp section 38 and a second plane section 39 which is located at a higher level with respect to the first plane section 37.

Similarly, the fourth guide means 14 comprises a first plane contact support guide path 31 and a first frame guide path 34.

The second guide means 12 (see FIG. 10) comprises the second contact support guide path 32 and a cooperating second frame guide path 35. Similarly, the third guide means 13 comprises a second contact element guide path 32 and a second frame guide path 35. Second frame guide path 35 comprises a first plane or flat section 40 and a ramp surface 41 and second plane section 47 adjacent to the plane section 40. Plane section 47 forms at its free end an inclined abutment surface 43 (see FIG. 11) The second section 42 is located on a higher elevation with respect to first section 40 From FIGS. 10 and 11 it can be recognized that the second contact support guide path 32 comprises a plane section 47 and adjacent thereto a ramp section 48 which forms an abutment surface 49 on a level higher than the section 47.

In accordance with FIG. 7 the support and guide means 10 are located totally within the width of the chipcard 2 and specifically within the outer circumference of the frame 5. This leads to an extremely narrow design for the chipcard reader 1 of the invention.

The holding and brake means 17 of the invention are specifically shown in FIG. 4 as well as in FIG. 7 through 9.

The frame 5 comprises four frame parts 51-54 as is shown in FIG. 7. The frame 5 can further be provided with a bottom part 50 which connects the frame parts 51 through 54. This is shown for example in FIGS. 6, 8 and 9. The bottom part 50 does not have to be present and is indeed not present if a corresponding bottom part is provided by the apparatus 3 within which the chipcard reader is used. By not providing the bottom part 50 a further reduction in the height of the chipcard reader of the invention is achieved. The separating line 55 in FIG. 6 shows where the separation has to occur if no bottom part 50 is required.

In accordance with a preferred embodiment of the invention the holding or brake means 70 are provided in the form of spring arms 56 and 57 (FIG. 8). The spring arms 56 and 57 are integrally formed with the frame 5, specifically with the frame part 53. Each of the spring arms is formed of plastic material as is true for the frame 5 itself. Both the spring arms as well as the frame are for example formed by injection moulding. Each of the arms 56 and 57 extends into the frame opening 4 in a direction opposite to the direction of insertion of the chipcard 2. Each of the spring arms 56 and 57 comprises a ramp surface 58 as well as adjacent thereto a holding or braking surface 59 Prior to the insertion of the chipcard the ramp surfaces 58 are located in the path of movement of the chipcard 2, so that the spring arms 56 and 57 can be lifted, so as to engage the chipcard 2 in that position with the braking surfaces 59 being resiliently applied on the chipcard for holding the same. In this position, chipcard 2 is pressed against the bottom part 50 or a similar surface provided by the apparatus 3. Any number of spring arms 56 and 57 can be provided Preferably two spring arms are provided, each of which is located adjacent to the frame parts 52 and 55. Said spring arms 56 and 57 extend from the frame part 53 (see specifically FIGS. 8 and 9). The spring action of the spring arms 56 and 57 can be increased by additional spring means.

With regard to the frame guide paths 34 and 35 it should be noted that they are formed in the two frame parts 52 and 54, particularly adjacent to the opening 46 formed by said frame 5.

It is possible to insert the contact element support 6 with its guide elements 23 through 26, which are arranged at the sides, without any difficulties into opening 46 such that the corresponding guide paths on the contact support and on the frame come into engagement with each other. In the initial position of the contact element support 6 (see the dashed representation in FIG. 3) a sufficient overlapping 61 and 62 is obtained between the plane sections 42 and 47 and 31 and 39, respectively.

The contact support 6 carries at its bottom surface 46 (see for instance FIG. 5) two (see FIG. 7) transport means 65 which extend into the path of insertion of the chipcard 2. At the opposite end of the contact element support 6 upwardly extending projections 66 are provided adjacent to the frame parts 52 and 54. Projection 66 serve as abutments for the two legs of a bracket spring which forms the already mentioned spring means 8. Spring 8 is located centrally at a locating means 67 (see FIGS. 4 and 7) of the frame 5.

A set 69 of contact elements 20 is located substantially centrally in the contact element support 6. The contact elements 20 of set 69 are for instance connected with a flat cable or a flexible circuit 70 It is possible to manufacture the set 69 of contact elements separately from the contact element support 6, and, thereupon, fixedly mount said set 69 to contact support 6. Preferably however, the set 69 of contact elements 20 and the contact element support 6 are an integral part which is preferably made by injection moulding.

It is preferred that the individual contact elements 20 of the set of contact elements are moulded in the set 69 of contact elements and the contact element support 60, respectively, in a biased condition. This is shown in FIG. 12 for a single contact element 20. In accordance with FIG. 12 the contact element 20 comprises at its right end either an insulation displacement termination for the flat cable or a soldering pin for a flexible circuit 70. Adjacent thereto, the contact element 20 comprises a first area 71 in which plastic material was moulded around the contact element 20. A second area 72 of the contact element 20 is in abutment with an abutment surface 74 provided for by a recess 73. The biased rest position of the contact element 20 is referred to by reference numeral 76. Reference numeral 77 refers to the non-biased position of the contact element 20 and 78 refers to the position of the contact element 20 in a situation where contact engagement with a chipcard is achieved In FIG. 7 it is shown that a plurality of recesses 73 is provided, each one for a contact element 20 The free ends of the contact elements extend into an opening 79.

In accordance with the invention the end position switch 21 is provided in a manner shown in FIGS. 6 and 7. The end position switch 21 comprises two contact elements 80 and 81. At the contact element 80 an arm 82 is provided which extends under the contact element 81 The two contact elements 80 and 81 are spring leaf contacts, a fact which leads to a low cost production and a low height After the contact element support 6 has reached its reading position, the end position switch 21 will be actuated by the frame 5. According to a particular embodiment frame 5 has a projection 83 which moves onto the spring leaf contact element 80 and thereby provides via arm 82 the connection to the contact 81. This closes the electrical circuit and permits the contact support 6, which is in the reading position, to operate. The contact elements 80 and 81, and particularly the contact element 80, extend into the longitudinal direction, i.e. the direction of insertion of the chipcard. Inasmuch as the leaf spring contact element 80 is pushed by projection 83 substantially upwardly, only a negligibly small force component will act in a direction opposite to the direction of insertion of the chip card when the end position switch 21 is in its closing position.

When using the chipard reader 1 of the invention, a chipcard 2 is inserted into the insert opening 84 (see FIG. 6). Insert opening 84 is formed by the frame 6 and the bottom portion 50 and the apparatus 3, respectively. The insertion of the chipcard causes an abutment at the transport means 65 and, if the insert movement of the chipcard 2 is continued, the contact element support 6 will be moved from the initial position shown (in light dashed lines) in FIG. 7 into the solid line reading position FIGS. 8 and 9 show the reading position and the initial position, respectively. When the chipcard 2 is moved together with the contact element support 6, the transfer from the light dashed FIG. 3 position into the solid line reading position occurs. It is clear that during this movement of the contact element support 6 in the frame 5 a downwardly guided movement for said contact element support 6 occurs. This downward movement is generated via ramps and occurs from a plane defined by the plane sections 33 and 39 to a lower level defined by the plane sections 40 and 47. In the reading position the contact elements 20 are pressed against the contacts on the chipcard, particularly due to the inherent bias of the contact elements 20. Moreover, the abutment surfaces 49 provide support.

The brake means 17 already mentioned, maintain the chipcard in the reading position.

After the reading operation is finished, the operator will apply a pulling force to the end of the chipcard extending out of the opening 84, so that the chipcard is moved away from said brake means 17. At the same time, due to spring means 8, the contact element support 6 is returned into its initial position and the chipcard can be removed by the operator.

FIG. 13 shows a preferred design of the second and third guide means 12 and 13 of FIGS. 2 and 3. FIG. 13 specifically explains an improvement of the third guide means. Third guide means are referred to in FIG. 13 by reference numeral 13. It should be noted that similar explanations are true for the required second guide means which would correspond to the second guide means 12. Moreover, in an embodient of the invention in accordance with FIG. 13, the first and fourth guide means 11 and 14 can also be improved by adding a limiting means in the area of the third guide means referred to by reference numeral 214.

Referring now to guide means 213 it should be noted that the guide element 25 is changed into the guide element 225 by adding material at the upper side and removing material at the lower side. The second frame guide path 35 is provided here in a manner similar to the embodiment of FIG. 11, but in addition another frame guide path 300 is provided which has guide surfaces 301 and 302 which are offset with regard to their level or height The frame guide surface 302 ends at a location shown by dashed vertical line 303 in FIG. 13, as close second frame guide path 35.

Adjacent to the abutment surface 49 a planar guide surface 304 is formed by the added material. At the location where the material at the guide element 225 is removed, see the recess 305, a planar guide surface 306 is formed which can move over the surfaces 302 and 301.

With regard to the third guide means 214 it is noted that it is formed in the same manner as a corresponding second guide means (not shown) and comprises (as is shown in the right part of FIG. 11) limiting means 310 formed at the frame 5 and forming a guide surface 311 which cooperates with a guide surface 312 at the guide element 226. By means of these features of the invention, tilting movements of the frame are avoided.

FIG. 14 shows in a representation similar to FIG. 4 a further modification of the brake means 17 which are referred to here by reference numeral 170. The brake means 170 comprise, similar to the brake means 17, a spring arm 171 which is integral with the frame 5. However, in this embodiment the spring arm 171 is reenforced in its action by additional spring means. The additional spring means are shown in the form of a metal leaf spring 172 comprising two spring arms 173 and 174. The spring arm 173 is in engagement with the upper side of the spring arm 171 and the spring arm 174 encompasses the frame 5 from below. Brake means 170 are totally arranged at the frame 5 and do not require for their operation a bottom part.

Those skilled in the art will appreciate that modifications other than those described above are also to be construed as within the scope of the invention. Consequently, it is intended that the invention be limited solely by the appended claims.

We claim:

1. A chip card reader apparatus comprising:
   a stationary frame with upper and lower surfaces;
   an opening in said stationary frame;
   a contact element support comprising means including an integral set of electrical elongate metal contact elements for contacting corresponding contacts on the chipcard;
   means for biasing said contact elements against said chipcard; and
   guide means for reciprocally mounting said contact element support within said opening for movement between an initial position and a reading position and for positively guiding the contact elements between the initial position and the reading position and vice versa,
   said guide means comprising:
   a guide element provided on said contact element support;
   a first frame guide path provided on said frame, wherein said first frame guide path provides a limitation against movement of said contact element support in an upward direction, said first frame guide path being open in a downward direction and comprising a first flat section adjacent to a ramp surface, and adjacent to the ramp surface a second flat section, said second flat section being located at a higher elevation than said first flat section; and
   a second frame guide path provided on said frame, wherein said second frame guide path provides a limitation against movement away from the upper surface, said second frame guide path being open in an upward direction and comprising a first guide surface and a second guide surface with a ramp section in between, said guide surfaces being offset with regard to their elevation.

2. The apparatus of claim 1 wherein said guide means includes on said frame and on said contact element support guide paths arranged to guide the movement of the contact element support between the initial position and the reading position in such a manner that the contact element support is initially moved on a first level towards the reading position, is subsequently transferred to a second level which lies in a different plane from said first level, and finally is moved along said second level into said reading position.

3. The apparatus of claim 2 wherein said guide path on said contact element support is formed directly in said contact element support.

4. The apparatus of claim 2 wherein said guide path on said contact element support and said guide path on said frame are arranged within the perimeter of a chipcard when the chipcard is within the chipcard reader.

5. The apparatus of claim 2 wherein said guide means includes four pairs of said guide paths, said two levels being connected by pairs of guide path which define diagonals in respect to the levels, and wherein the diagonally arranged pairs of guide paths connecting said two levels are substantially identical.

6. The apparatus of claim 2 wherein said guide paths on said contact element support comprise guide elements of said contact element support.

7. The apparatus of claim 2 wherein said guide paths on said frame are on inner sides of lateral parts of said frame.

8. The apparatus of claim 2 wherein oppositely located pairs of guide paths are arranged to provide form-fit guidance of said contact element support such that one pair of said guide paths provides a limitation in movement of said contact element support in a first direction perpendicular to the plane of chipcard insertion while another pair of said guide paths provides a limitation in movement of said contact element support in a direction opposite the first direction.

9. The apparatus of claim 2 wherein the frame is integrally formed with said guide paths.

10. The apparatus of claim 9 wherein said frame is integrally formed with a second frame member arranged to substantially enclose said apparatus.

11. The apparatus of claim 2 wherein the guide paths are provided in pairs, and the pairs of guide paths are arranged such that the cross-point diagonals connecting said pairs of guide paths is located approximately in the center of the set of contact elements of the contact element support.

12. The apparatus of claim 6 wherein said guide elements extend from sides of the contact element support towards lateral parts of the frame and are formed together with the contact element support by injection moulding.

13. The apparatus of claim 12 wherein said guide elements have a length such that portions of said guide elements face each other or overlap in an initial position of said guide elements.

14. The apparatus of claim 1 wherein the contact elements are biased during an injection moulding operation.

15. The apparatus of claim 1, wherein the contact elements are biased, during assembly of the apparatus, in a direction to engage the chipcard.

16. The apparatus of claim 1 further comprising an end position switch which includes two leaf spring contacts arranged such that one of said leaf spring contacts is actuated shortly before the reading position is reached during movement on the contact element support.

17. The apparatus of claim 16 wherein a switching lobe projection is arranged on the frame for actuating the end position switch.

18. The apparatus of claim 1 wherein said chipcard brake includes a metal leaf spring arranged to increase the brake force.

19. The apparatus of claim 1 wherein said chipcard brake is arranged to apply braking pressure by contacting said chipcard.

20. The apparatus of claim 1 wherein said chipcard brake and frame are integrally formed of a plastic material and wherein the chipcard brake is arranged to be moved to a breaking position due to the insertion of the chipcard.

21. The apparatus of claim 1 wherein said chipcard brake includes two hook-shaped brakes arranged in a spaced relationship in respect to each other.

22. The apparatus of claim 1 further including spring means for biasing the contact element support into its initial position.

23. The apparatus of claim 22 wherein the spring means include a bracket spring having two spring arms which are in engagement with the contact support and the frame, respectively.

24. The apparatus of claim 23 wherein the bracket series is adjacent an input opening for the chipcard.

25. The apparatus of claim 1 further comprising a chipcard brake arrange to press against and fixedly hold the card in its reading position, wherein said contact element support moves from said initial to said reading position in response to pushing of the card into the reader, and moves from said reading to said initial position in response to pulling of the card from the reader.

26. A chipcard reader comprising:
a stationary frame;
an opening in said stationary frame;
a contact element support comprising means including an integral set of electrical contact elements for contacting corresponding contacts on the chipcard;
guide means for reciprocally mounting said contact element support within said opening for movement between an initial position and a reading position and for positively guiding the contact elements between the initial position and the reading position and vice versa;
means for biasing said contact elements against said chipcard;
a chipcard brake arranged to press against and fixedly hold the chipcard in its reading position, wherein said contact element support moves from said initial to said reading position in response to pushing of the car into the reader, and moves from said reading to said initial position to pulling of the card from the reader;
an end position switch which includes two spring contacts arranged such that one of said leaf spring contacts is actuated shortly before the reading position is reached during movement of the contact element support;
a switching lobe projection arranged on the frame for actuating the end position switch, said two leaf spring contacts comprising an upper contact and a lower contact, said lower contact being actuable by said projection so as come to into contact via an arm with the upper contact, and wherein the lower contact, when the chipcard is in th reading position, abuts the projection such that no force is applied to the contact element support in the direction of movement of the contact element support towards the initial position.

* * * * *